Dec. 19, 1967  R. KENK  3,359,183
SOLAR STILL WITH HEAT REFLECTIVE ROOF
Filed July 30, 1965

INVENTOR.
ROMAN KENK,
BY
Berman, Davidson & Berman
ATTORNEYS.

United States Patent Office 3,359,183
Patented Dec. 19, 1967

3,359,183
SOLAR STILL WITH HEAT REFLECTIVE ROOF
Roman Kenk, Alexandria, Va. (3025 Ontario Road NW., Apt. 504, Washington, D.C. 20009)
Filed July 30, 1965, Ser. No. 475,959
5 Claims. (Cl. 202—190)

ABSTRACT OF THE DISCLOSURE

A solar still comprising: liquid receiving and condensate-receiving compartments in communication at their upper ends; a condensing surface overlying said compartments and inclined downwardly from the liquid receiving toward the condensate-receiving compartment; a closed convection circuit connected to said liquid-receiving compartment respectively adjacent the bottom of said compartment and adjacent the upper level of liquid in said compartment, and solar reflecting means adjacent the upper branch of said convection circuit.

---

This invention relates to the general field of solar-energized devices and, more specifically, the instant invention relates to a solar still wherein the distillation is achieved through the use of solar heat emission.

One of the primary objects of this invention is to provide a solar-operated still for the purpose of obtaining distilled substantially pure water from sea or brackish water, or water having a high concentration of mineral salts in solution therewith or water having other highly soluble solids or compounds therein. The effective distillation of salt water by solar devices heretofore known in the art has not been achieved since it is most difficult to obtain palatable drinking water or water suitable for other uses, commercial or domestic as, for example, in steam irons, electric batteries, cooling systems, and other apparatus which depends upon substantially pure water for satisfactory operation.

Of course, the prior art disclosing apparatus for distilling liquids through the use of heat energy derived from the sun is old and well-known, but for the most part, such devices or mechanisms have proved to be highly inefficient, expensive to operate, and are bulky in construction. Such installations are generally considered as being of little or no use in commercial enterprises, and are ineffective, for the most part, to supply small-scale domestic or emergency needs.

It is, therefore, another important object of this invention to provide a solar still for obtaining a substantially pure water distillate from water charged with undesirable chemicals, sodium chloride, magnesium sulphate, calcium chloride or other salts or chemical compounds or compositions, the still utilizing solar rays in conjunction with apparatus which is compact, non-complex in construction and assembly, inexpensive to manufacture, rugged and durable in use, and which is highly efficient when judged in the light of mechanisms or apparatus heretofore known in the art.

Other and further objects and advantages contemplated by this invention will become more manifest from a consideration of the following specification when read in conjunction with the annexed drawing, in which.

Figures 1, 2, 3:
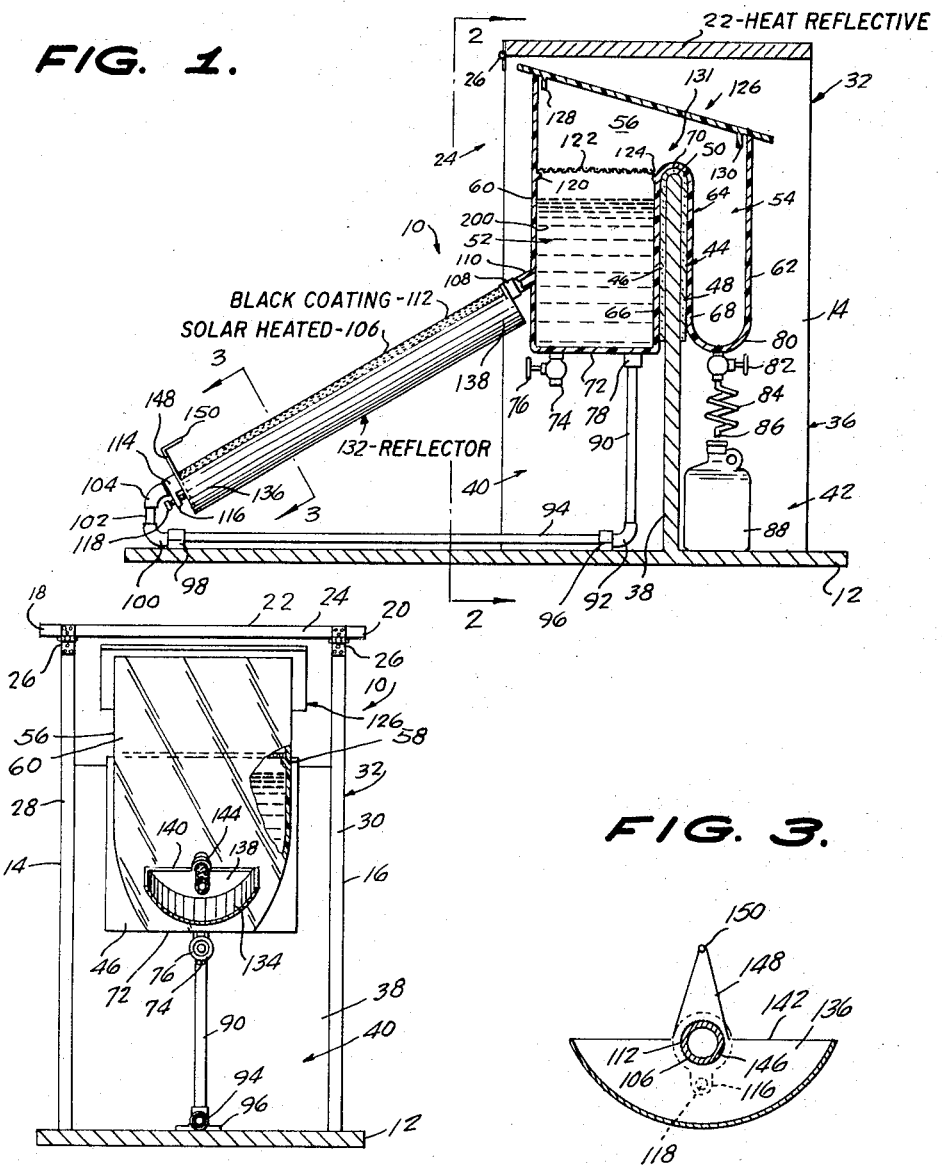
FIGURE 1 is a side elevational view of a solar still constructed in accordance with this invention, FIGURE 1 being partially broken away to illustrate the arrangement and construction of component elements of the still.
FIGURE 2 is an end elevational view, partly in cross-section, FIGURE 2 being taken on the vertical plane of line 2—2 of FIGURE 1, looking in the direction of the arrows.
FIGURE 3 is an enlarged detail cross-sectional view, FIGURE 3 being taken on the inclined plane of line 3—3 of FIGURE 1, looking in the direction of the arrows.

Referring now more specifically to the drawing, reference numeral 10 designates, in general, a solar still constructed in accordance with the teachings of this invention. As shown in the several figures of the drawing, the solar still 10 is seen to comprise a normally horizontal elongated substantially rectangular base 12. The base 12 adjacent to one of its ends, is provided with a pair of vertically-elongated, laterally-spaced and substantially parallel sidewalls 14, 16, the lower ends of the sidewalls 14, 16 being fixedly-secured by conventional means (not shown) to the opposed longitudinally-extending marginal edges of the base 12 adjacent said end thereof. The upper ends of the sidewalls 14, 16 terminate in a common horizontal plane and support thereon the oppositely-disposed ends 18, 20 of an elongated substantially rectangular cover plate 22. The front edge 24 of the cover plate 22 is hingedly-connected at 26 to the front edges 28, 30 of the sidewalls 14, 16 respectively. The sidewalls 14, 16, the cover plate 22, and that portion of the base 12 extending between the lower ends of the sidewalls 14, 16 cooperate to form a vertically-elongated substantially hollow rectangular housing 32 having opposed open sides 34, 36. The base 12, adjacent its aforementioned one end, is provided with a vertically-extending divider and support wall 38 having a substantially rectangular configuration, the divider and support wall 38 having its vertically-extending edges fixedly-secured to the inner sides of the sidewalls 14, 16. As is seen in FIGURES 1 and 2, the upper end of the divider and support wall 38 terminates below the closure member 22 to serve a function to be described. Preferably, the base 12, the sidewalls 14, 16, and the divider and support wall 38 are formed of a non-heat conducting material (wood, for example), and the cover plate 22 is formed of a highly heat-reflective material, such as aluminum.

To serve a function to be described, the divider and support wall 38 divides the housing 32 vertically into two open-sided compartments 40, 42, and telescoped over the upper end of the divider and support wall 38 is a heat-insulating shield 44 having side arms 46, 48 disposed in face-to-face contact with adjacent sides of the divider and support wall 38, and a bight portion 50 connects the upper pair of adjacent ends of the side arms 46, 48 and rests on and is supported by the upper free end of the divider and support wall 38.

The still 10 comprises a pair of receptacles 52, 54, the receptacles 52, 54 having a pair of opposed substantially parallel, laterally-spaced sidewalls 56, 58 common to one another, and a pair of remotely-disposed spaced and substantially parallel upright outer walls 60, 62. A substantially upright compound inverted U-shaped inner wall 64 is positioned inwardly from the outer walls 60, 62 and is common to both of the receptacles 52, 54. As is seen in FIGURE 1 of the drawing, the compound inner wall 64 is telescoped over the shield 44 with the walls 66, 68 of the shield 44 lying flush against the side arms 46, 48 of the shield 44, the sidewalls 66, 68 forming the back walls of the receptacles 52, 54. With the sidewalls 66, 68 so positioned, its connecting bight portion 70 nests on and is supported by the bight portion 50 of the shield 44. The inner wall or compound wall 64 is so positioned that its sidewalls 66, 68 are parallel to the outer walls 60, 62 with the bight portion 70 thereof being spaced below the upper end of the outer walls 60, 62. It should also be noted at this point that the outer wall 62 has its upper end spaced below the upper end of the outer wall 60 to serve a function to be described. The lower ends of the outer walls 60, 62, the inner walls 66, 68, and those portions of the common sidewalls 56, 58 extending therebetween are downwardly and inwardly-curved to meet a horizontal substantially rectangular bottom wall 72.

An elongated hollow cylindrical fluid drain conduit 74 depends from the bottom wall 72 and is in open communication at its upper end with the receptacle 52. Interposed in the conduit 74 is a conventional valve 76 which controls the fluid flow through the conduit 74. The bottom wall 72 is also provided with an elongated substantially hollow boss 78 to which further reference will be made.

The lower end of the receptacle 54 is closed by an arcuate bottom wall 80 from which depends a normally closed valved fitting 82 which, in turn, is connected with the upper end of a helicoidal conduit 84 having an open lower end 86 disposed in vertically-spaced relation relative to the base 12. The lower end 86 is normally positioned, when the still 10 is in operation, over the open upper end of a normally open-mouthed jar, container, or other similar vessel 88 supported on the base 12 in the compartment 42.

The lower end of the boss 78 is connected to one end of an elongated upright hollow cylindrical conduit 90, the other end of the conduit 90 being connected with one end of a conventional elbow connector 92. To the other end of the latter is connected one end of a hollow cylindrical conduit 94 which extends longitudinally and substantially parallel to the longitudinal axis of the base 12. The conduit 94 adjacent each end thereof is fixedly-secured to the base 12 by conventional brackets 96, 98 (see FIGURES 1 and 2). The other end of the conduit 94 connects through a second elbow connector 100 with one end of a relatively short upright hollow cylindrical conduit 102, and the other end of the conduit 102 connects through an elbow connector 104 with one end of an elongated hollow cylindrical metal conduit 106. As is seen in FIGURE 1 of the drawing, the conduit 106 extends upwardly from the connector 104 making an angle of approximately 30° with respect to the plane of the base 12, and its other end connects through a coupler 108 with one end of a hollow cylindrical boss 110 which projects laterally and outwardly from the front wall 60 intermediate the upper and lower ends thereof and is in open communication with the receptacle 52. The entire exterior surface of the conduit 106 is coated at 112 with a heat-absorbing layer or coating such as carbon black or with other materials having a high heat-absorbing factor. The aforementioned first end of the conduit 106 has fixedly-secured thereon a substantially hollow collar 114 carrying a depending lug 116 through which is threaded an adjusting screw 118. The function of the adjusting screw 118 will be set forth in detail below.

As is seen in FIGURE 1 of the drawing, the outer wall 60, adjacent the upper end thereof, is integrally-constructed with a normally horizontally-extending rib 120 which serves as support means for one side a substantially rectangular wire screen 122 having a fine mesh. The other side of the screen 122 terminates in an upwardly-turned flange 124 which rests on the wall 66 adjacent its junction with the bight portion 70. The upper ends of both of the compartments 52, 54 are closed by a substantially rectangular closure member 126 from which depends a vertical continuous flange 128 spaced inwardly from the peripheral edge of the closure member 126, to prevent the inadvertent or accidental displacement of the closure member, and to seal the same with the front and sidewalls of the compartments 52, 54 to prevent seepage of condensed water. As is seen in FIGURE 1, the closure member 126 is supported on the upper ends of sidewalls 60, 62, and when so positioned, the closure member 126 is inclined downwardly from the front wall 60 to the front wall 62, and cooperates with the bight portion 70 to form a throat 131 establishing communication between the receptacles 52, 54.

Reference numeral 132 denotes an elongated arcuate reflector having a highly-polished and highly-reflective concave surface 134 for the reflection of solar heat rays. the reflector 132 may have a parabolic configuration, but regardless of its shape, the reflector 132 must be so constructed as to have its focal line falling on the longitudinal axis of the conduit 106. As is seen in FIGURE 1, the opposed ends of the reflector 132 are closed by longitudinally-spaced and substantially parallel arcuately-shaped suspension hangers 136, 138. The outer peripheral edge of each hanger 136, 138 is fixedly-secured by conventional means to that end of the reflector 132 immediately adjacent thereto, and the hangers 136, 138 are each, adjacent their respective chord edges 140, 142, apertured as at 144, 146 to receive therethrough the conduit 106 and thereby support the reflector 132 for pivotal movement about the longitudinal axis of the conduit 106. To serve a function to be described, the hanger 136 is provided with a support arm 148 that projects upwardly from the chord edge 142 adjacent the mid-point of the latter, and the upper free end of the support arm terminates in a laterally-offset indicator rod 150 which overhangs the conduit 106. The arrangement and disposition of the suspension hanger 136 with respect to the adjustment screw 118 is such that the screw 118 is adapted to bear against the exterior side of the hanger 136 and to frictionally-engage the same to hold the reflector 132 in any pivoted adjustment thereof about the longitudinal axis of the conduit 106.

Having described in detail the component elements of the still 10, the operation thereof is deemed to be self-evident. However, in the interest of clarity, the operation thereof is briefly set forth below.

The still 10 is, of course, placed outdoors in a normally unshaded area whereby the conduit 106 may be exposed, substantially continuously throughout the daylight hours, to solar heat rays. Preferably, the still 10 is arranged in such a manner that the longitudinal axis of the conduit 106 lies in an East-West direction. The operator of the still 10 now backs-off the adjusting screw 118, releasing the reflector 132 for pivotal movement about the longitudinal axis of the conduit 106 and, when the shadow cast by the indicator rod 150 extends on the outer side of the conduit 106 and is substantially centered on the conduit 106, the adjusting screw 118 is tightened to hold the reflector 132 in this adjusted position.

The cover plate 22 is now pivoted to its open position about its hinge connections 26 and the closure member 126 is now removed from the upper ends of the front walls 60, 62. The receptacle 52 is now filled through the screen 122 with sea water or other liquid to be distilled. The closure member 126 is now replaced and the cover plate 22 is then pivoted back to the position shown in FIGURES 1 and 2. It should be here noted that the receptacle 52 is filled to a point below the upper end of the sidewall or backwall 46; this point being located substantially above the opening of the boss 110 into the receptacle 52. The water or other liquid here identified by reference numeral 200 completely fills the conduits 90, 94, 102 and 106, and as the water disposed in the conduit 106 becomes heated, the same moves upwardly for discharge into the receptacle 52 drawing downwardly through the conduits 90, 94 and upwardly through the conduit 102 replacement water for the water leaving the conduit 106, thereby establishing a continuous cycle of water circulation. The water leaving the conduit 106 is introduced into the compartment 52 adjacent the water level and, of course, since this water is at a higher temperature than the water disposed within the receptacle 52, the water in the receptacle 52 becomes heated.

As the water circulates through the several conduits, the water in the upper end of receptacle 52 is raised to its vaporization temperature and vaporizes to partially collect in the compartment extending above the water level and below the screen 122, as well as entering the compartment 54. As there is a considerable temperature difference between the water vapor and the adjacent walls, the vapor will condense on the underside of the closure member 126 and on the front wall 62. The droplets on the closure member 126 will slide downwardly toward the receptacle 54 where the distilled water will collect. The purpose of the wire screen 122 is to prevent the splashing of the liquid into the compartment 54 should the liquid 200 be agitated by boiling.

The cover plate 22, being formed of aluminum or other light-reflecting material, reflects the sun's rays and protects the cover plate 22 and the front walls 60, 62 from being heated to a temperature which would adversely affect the condensation of the water vapor thereon.

After a sufficient amount of distilled water has accumulated in the receptacle 54, the valved fitting 82 is opened to permit the condensate to move downwardly through the helicoidal conduit 84 for ultimate discharge into the vessel 88. As the condensate passes through the conduit 84 the same is cooled under the influence of the air which is at atmospheric temperature.

Of course the valved fitting 82 may be left in its open position throughout the distillation process to continuously air cool the condensate passing through the helicoidal conduit 84. The valved fitting 82, under such circumstances, is then only closed when it becomes necessary to substitute a second vessel for the vessel 88 after the latter has been filled. As the distillation process continues, the mineral salts and other compounds normally found in salt water are retained in the liquid remaining in the receptacle 52, and in the connecting conduits. As the evaporation or distillation of the liquid 200 continues, the liquid 200 will gradually fall to a level approximately the level of the boss 110. At this point, the water no longer circulates through the conduit system described above, and the operator now drains the receptacle 52 through the conduit 74 and valve 76 and refills the receptacle 52 to the desired level in the manner described above.

Having described and illustrated one embodiment of this invention in detail, it will be understood that the same is offered merely by way of example, and this invention is to be limited only by the scope of the appended claims.

What is claimed is:

1. A solar still for distilling a liquid, said still comprising a pair of upright receptacles, each of said receptacles comprising a pair of opposed spaced outer and inner walls, a pair of opposed spaced sidewalls, and a bottom wall, said receptacles having adjacent open upper and closed bottom ends, said receptacles being disposed with said inner walls spaced from but confronting one another and with said front walls being remotely-disposed relative to one another, means connecting together the upper ends of each of said inner walls, said upper ends of said inner walls being spaced below the upper ends of said front walls and said front wall of one of said receptacles being spaced below said front wall of the other of said receptacles, a closure member and condenser means extending across the upper ends of said front walls of both of said receptacles, said closure member being downwardly-inclined from said front wall of said other of said receptacles toward said front wall of said one of said receptacles, said closure member cooperating with said upper ends of the inner walls to form an open throat establishing communication between the upper ends of said receptacles, means supporting said receptacles in their said upright positions, a liquid distilland circulation system including a conduit having an end in open communication with said other receptacle through said bottom wall thereof and at its other end in open communication with said other receptacle through its said front wall and adapted to be below the level of the liquid distilland disposed in said other receptacle, and said conduit including a portion thereof having its longitudinal axis disposed at an acute angle relative to a horizontal plane and being exposed to solar heat emission whereby said heat emission causes said liquid in said conduit portion to rise for discharge in said other receptacle to heat said liquid therein and to effect liquid circulation through said other receptacle and said conduit, said liquid heated in said conduit portion heating said liquid in said other receptacle to cause vaporization thereof and subsequent condensation on said closure member, the condensate collecting and sliding downwardly on the underside of said closure member for discharge and collection in said one receptacle, said conduit portion being provided with a coating having high heat-absorbing characteristics, reflector means mounted on said conduit portion adjacent the opposed ends thereof, said reflector means having a focal line lying on the longitudinal axis of said conduit portion, means for pivoting said reflector means about the longitudinal axis of said conduit portion to a selected adjusted position, and means for holding said reflector means in its said adjusted position, a wire mesh screen extending across said open end of said other of said receptacles, said screen being disposed in vertically-spaced relation relative to said liquid level and to said closure member, drain means connected with said bottom wall of said other of said receptacles, a helicoidal conduit for passing condensate having one of its ends fixedly-secured to said bottom wall of said one receptacle and being in open communication therewith, valve means interposed in said helicoidal conduit, indicator means fixedly-secured to said reflector means and cooperating with said conduit portion to indicate proper adjustment of the position of said conduit portion relative to the path of travel of the sun, and a housing mounted on said support means, said housing including a pair of sidewalls disposed proximate to but spaced from said sidewalls common to said receptacles, and said housing having a pair of opposed open sides to permit free air circulation therethrough.

2. A solar still comprising distillation-compartment for holding liquid for distillation and a condensate-receiving compartment separated by a common wall and being in communication with each other above said wall; said compartments each comprising an outer front wall, the top of the distillation-compartment front wall terminating above the top of said condensate-receiving compartment front wall; a two-legged, closed liquid convection conduit through which said liquid is circulated; said convection conduit having a horizontal leg connected to the bottom of said distillation-compartment and an inclined leg connected to the front wall of said distillation-compartment for passing heated liquid for distillation into said distillation-compartment at a point above the bottom and intermediate the upper and lower ends thereof; a lid acting as a condenser overlying both of said compartments, said lid being inclined downwardly from the top front wall of said distillation compartment to the rear of said condensate-receiving compartment; a heat reflective roof cover plate overlying and vertically spaced from said lid, and a reflector underlying said inclined leg for directing solar heat rays thereagainst.

3. A solar still as set forth in claim 2, including means to adjust the position of said reflector relative to said inclined leg.

4. A solar still as set forth in claim 3, in which said lid and said roof cover plate are movable to permit refilling liquid into said distillation compartment.

5. A solar still as set forth in caim 3, including an air cooled cooling coil through which said condensate is drained from said condensate-receiving compartment.

References Cited

UNITED STATES PATENTS

| | | | |
|---|---|---|---|
| 2,141,330 | 12/1938 | Abbot | 202—180 |
| 2,490,659 | 12/1949 | Snyder | 202—234 X |
| 2,803,591 | 8/1957 | Coanda et al. | 202—234 |
| 3,088,882 | 5/1963 | Justice | 203—10 X |
| 3,159,554 | 12/1964 | Mount | 202—234 |
| 3,300,393 | 1/1967 | Fisher | 202—234 X |

FOREIGN PATENTS

| | | |
|---|---|---|
| 838,722 | 1952 | Germany. |
| 8,318 | 1908 | Great Britain. |
| 454,558 | 9/1936 | Great Britain. |

WILBUR L. BASCOMB, JR., *Primary Examiner.*

F. E. DRUMMOND, *Assistant Examiner.*